May 30, 1967 J. T. LINGLE 3,323,075

OSCILLATOR WITH SATURABLE CORE DECOUPLING CONTROLS

Filed Sept. 3, 1965 2 Sheets-Sheet 1

INVENTOR.
JOHN T. LINGLE
BY Charles J. Ungemach
ATTORNEY

OSCILLATOR WITH SATURABLE CORE DECOUPLING CONTROLS

Filed Sept. 3, 1965 2 Sheets-Sheet 2

INVENTOR.
JOHN T. LINGLE
BY Charles J. Ungemach
ATTORNEY 3,323,075
OSCILLATOR WITH SATURABLE CORE DECOUPLING CONTROLS John T. Lingle, Bloomington, Minn., assignor to Honeywell Inc., Minneapolis, Minn., a corporation of Delaware Filed Sept. 3, 1965, Ser. No. 484,824
9 Claims. (Cl. 331—113)

The present invention pertains to oscillators. More particularly the present invention pertains to the type of oscillators wherein at least two transistors are operated in a switching mode to direct the current through a pair of alternate current paths on alternate halves of the oscillator cycle. A magnetic means is provided with a saturable core and a winding on the core is connected to the base electrodes of the switching transistors to cause switching in response to saturation of the magnetic core. The frequency of oscillation is determined by the voltage-time integral of the core and can be varied by varying the voltage applied across the winding on the saturable core.

The broad concept of such oscillators is old in the art. Examples are Patents 2,774,878 and 2,997,664. In these prior art oscillators, however, the switching speed and the efficiency are adversely affected by the fact that the conducting transistor acts as a zener diode clamp and limits the induced voltage in the feedback windings. This in effect limits the amount of back bias on the base-emitter junction of the other transistor. The present invention provides means for momentarily decoupling the feedback winding from the transistor while it is being switched "off," so that the transistor can be back-biased to a higher voltage. This higher voltage back-bias, provided by momentary decoupling, sweeps the stored carriers from the transistor more rapidly and results in more rapid switching. It also effectively reduces the switching losses.

The momentary decoupling is accomplished in the present case by inserting an additional winding between the base electrode of each of the two transistors and the associated feedback winding. Each of these additional windings is mounted on a saturable core. Also mounted on these saturable cores are additional windings which are connected in the series path of the output current. While the particular transistor is switching "off," this additional winding in its base circuit provides a relatively high impedance and momentarily decouples the base electrode from the feedback winding. The saturable core associated with this additional winding, however, has a low voltage-time integral and will saturate a short time after performing the desired decoupling function and will thereafter offer a low impedance path.

It is therefore an object of the present invention to provide an improved magnetic oscillator.

A more specific object of the present invention is to provide a transistor oscillator with a faster switching speed and greater efficiency.

Figure 1:
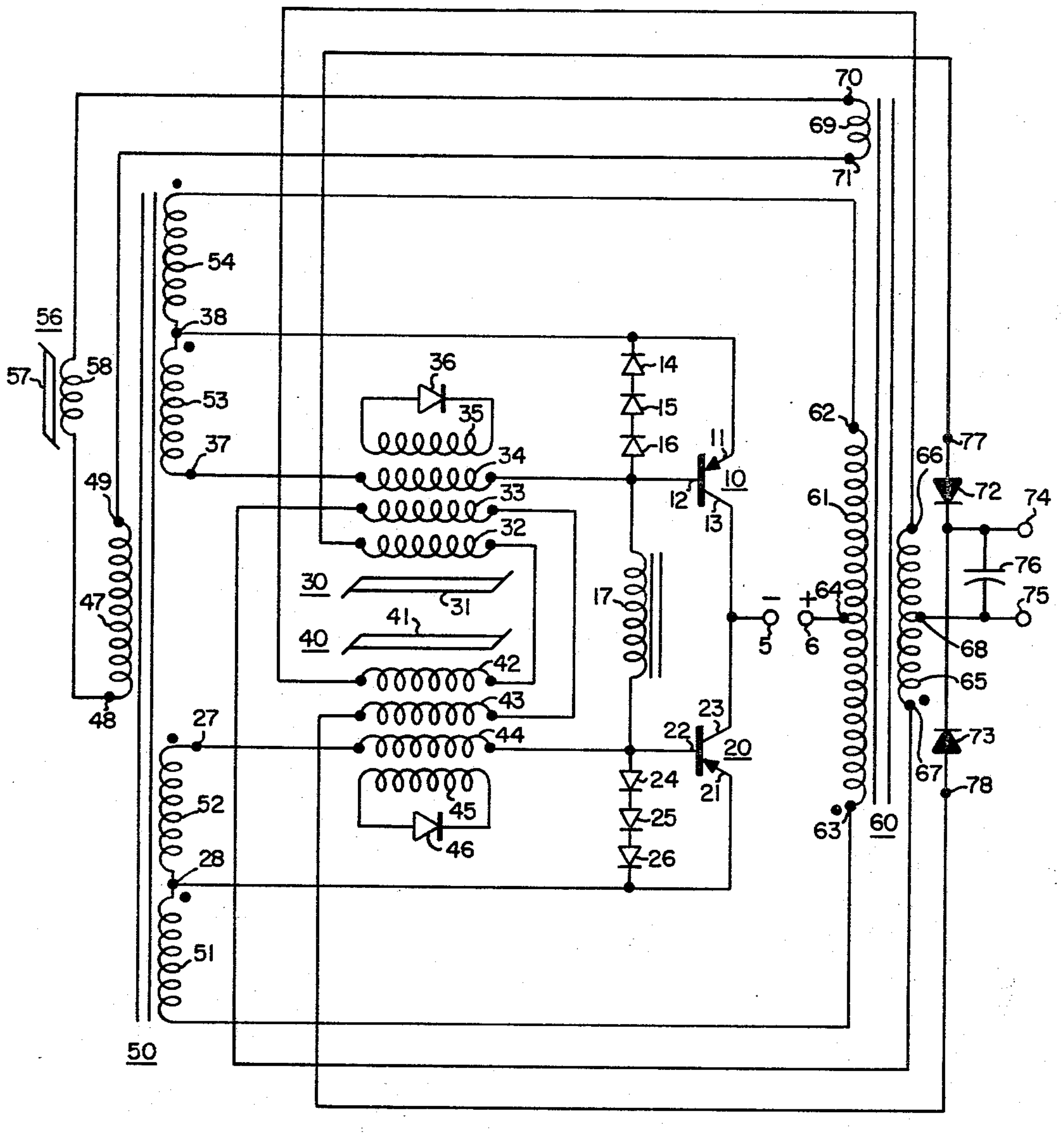
Figure 2:
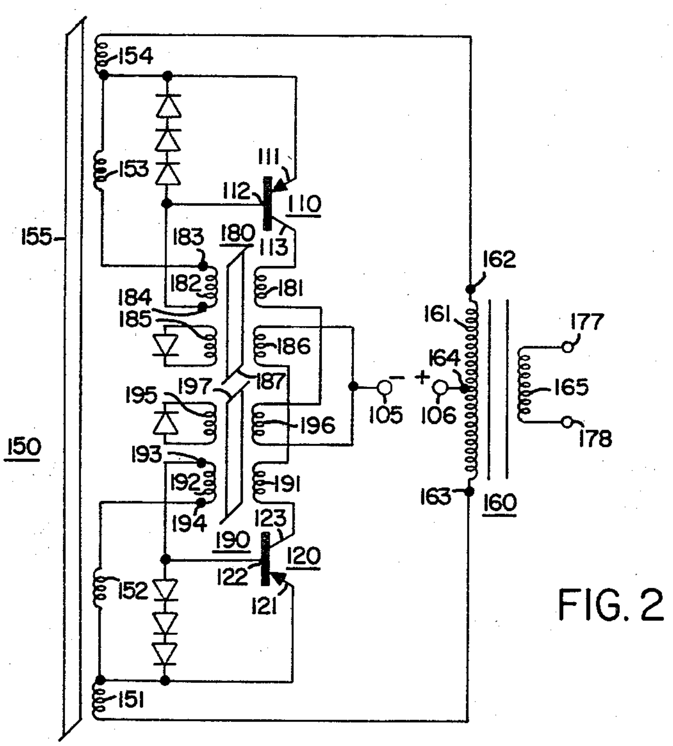
Figure 3:
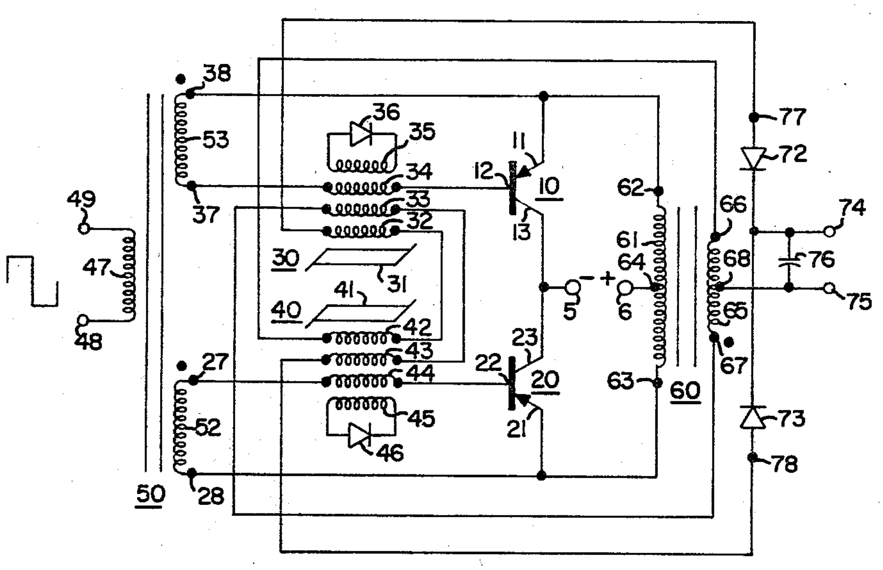

These and further objects will become apparent to those skilled in the art upon examination of the following specification, claims, and the drawings, in which:

FIGURE 1 shows a schematic circuit diagram of the preferred embodiment of a magnetic oscillator according to the present invention;

FIGURE 2 discloses a schematic circuit diagram of an alternate embodiment of the present invention; and FIGURE 3 illustrates an application of the present invention in an amplifier circuit.

Referring now to FIGURE 1 there is shown a low input voltage converter having a pair of transistors 10 and 20. Transistor 10 has an emitter 11, a base 12, and a collector 13, and transistor 20 has an emitter 21, a base 22, and a collector 23. Collectors 13 and 23 are connected directly to each other and also to an input terminal 5 which is connected to a negative terminal of a D.C. voltage supply source. The converter has a second input terminal 6 for connection to the positive terminal of the voltage source.

Base electrode 12 of transistor 10 is connected to one end of a winding 34 of a transformer 30. Transformer 30 has a saturable core 31 and additional windings 32, 33, and 35. The other end of winding 34 is connected to an end terminal 37 of a winding 53 on a feedback transformer 50. Winding 53 further has an end terminal 38 connected to emitter 11 of transistor 10. Transformer 50 also has windings 51, 52, 54, and 47. Winding 52 has end terminals 27 and 28 and winding 47 has end terminals 48 and 49.

Base electrode 22 of transistor 20 is connected to one end of a winding 44 on a transformer 40. Transformer 40 has a saturable core 41 and also has windings 42, 43, and 45. The other end of winding 44 is connected to end terminal 27 of winding 52 on transformer 50. The other end terminal 28 of winding 52 is connected to emitter electrode 21 of transistor 20. Emitter electrode 11 of transistor 10 is connected to one end of winding 54 on transformer 50, the other end of winding 54 being connected to an end terminal 62 of a winding 61 on a transformer 60. Winding 61 has a second end terminal 63 and also has an intermediate tap 64. Transformer 60 further has an output winding 65 with end terminals 66 and 67 and an intermediate tap 68. Intermediate tap 64 of winding 61 is connected to input terminal 6.

Transformer 60 in addition has a feedback winding 69 with end terminals 70 and 71. End terminal 71 of feedback winding 69 is connected to end terminal 49 of winding 47 on transformer 50. The other end terminal 70 of winding 69 is connected to one end of a winding 58 of a saturable reactor 56. The other end of winding 58 is connected to end terminal 48 of winding 47 on transformer 50. Reactor 56 has a saturable core 57.

Emitter electrode 21 of transistor 20 is further connected to one end of winding 51 on transformer 50, the other end of winding 51 being connected to end terminal 63 of winding 61 on transformer 60.

End terminal 66 of output winding 65 on transformer 60 is connected to one end of winding 42 on transformer 40. The other end of winding 42 is connected to one end of winding 32 on transformer 30. The other end of winding 32 is connected to a terminal 77. A diode 72 is connected between terminal 77 and an output terminal 74, the diode being oriented for easy current flow from terminal 77 to terminal 74. The other output terminal of the converter is terminal 75, which is connected directly to intermediate tap 68 of output winding 65.

End terminal 67 of winding 65 is connected to one end of winding 33 on transformer 30. The other end of winding 33 is connected directly to one end of winding 43 on transformer 40, the other end of winding 43 being connected to a terminal 78. A diode 73 is connected between terminal 78 and output terminal 74, diode 73 being oriented for easy current flow from terminal 78 to terminal 74. A capacitor 76 is connected between output terminals 74 and 75.

A diode 36 is connected between ends of winding 35 on transformer 30 and a diode 46 is connected between the ends of winding 45 on transformer 40. Diode 36 is arranged to conduct when transformer 30 applies forward drive to transistor 10 and diode 46 is arranged to conduct when transformer 40 applies forward drive to transistor 20.

An inductive choke 17 is connected between base electrodes 12 and 22 of transistors 10 and 20 respectively. Diodes 14, 15 and 16 are connected in series between a base electrode 12 and emitter electrode 11 of transistor 10, the orientation of these diodes being for easy current flow from base 12 to emitter 11. Diodes 24, 25, and 26 are connected in series between emitter electrode 21 and base electrode 22 of transistor 20, these diodes being oriented for easy current flow from base 22 to emitter 21.

In FIGURE 2, illustrating an alternate embodiment of the present invention, a transistor 110 has an emitter electrode 111, a base electrode 112, and a collector electrode 113. A second transistor 120 has an emitter electrode 121, a base electrode 122, and a collector electrode 123. An output transformer 160 is shown with a primary winding 161 and an output winding 165. The primary winding 161 has end terminals 162 and 163 and an intermediate tap 164. Intermediate tap 164 is connected to an input terminal 106 for connection to a positive potential terminal of a voltage supply source. Output winding 165 of transformer 160 is connected between a pair of output terminals 177 and 178.

Also shown in FIGURE 2 is a feedback transformer 150 with a saturable core 155 and windings 151, 152, 153, and 154. A pair of pulse transformers 180 and 190 are shown. Transformer 180 has a saturable core 187, and windings 181, 182, 185, and 186. Winding 182 has end terminals 183 and 184. Pulse transformer 190 has a saturable core 197 and windings 191, 192, 195, and 196. Winding 192 has end terminals 193 and 194.

Emitter electrode 111 of transistor 110 is connected to one end of windings 153 and 154 on transformer 150. The other end of winding 154 is connected to end terminal 162 of winding 161 on transformer 160, while the other end of winding 153 is connected to end terminal 183 of winding 182 on transformer 180. End terminal 184 of winding 182 is connected to base electrode 112 of transistor 110.

Emitter electrode 121 of transistor 120 is connected to one end of windings 151 and 152. The other end of winding 151 is connected to end terminal 163 of winding 161 on output transformer 160, and the other end of winding 152 is connected to end terminal 194 of winding 192 on transformer 190. End terminal 193 of winding 192 is connected to base electrode 122 of transistor 120.

Winding 181 of transformer 180 is connected between collector electrode 113 of transistor 110 and one end of winding 196 on transformer 190. The other end of winding 196 is connected to an input terminal 105 which is adapted for connection to the negative potential terminal of a D.C. voltage supply source. Winding 191 of transformer 190 is connected between collector electrode 123 of transistor 120 and one end of winding 186 of transformer 180. The other end of winding 186 is connected to input terminal 105.

FIGURE 3 illustrates an embodiment where the present invention is incorporated into a power amplifier circuit. Whereas in the embodiments of FIGURES 1 and 2 the drive is obtained through feedback, in the circuit of FIGURE 3 the drive power is supplied from a separate source. The amplifier circuit is similar to the circuit of FIGURE 1 except that the voltage feedback loop, comprised of saturable reactor 56 and winding 69 on output transformer 60, is eliminated. Also eliminated are the current feedback windings 54 and 51 on transformer 50. End terminal 38 of winding 53 is connected directly to end terminal 62 of winding 61 on output transformer 60, while end terminal 28 of winding 52 is connected directly to end terminal 63 on winding 61. The signal from the separate drive source is applied between end terminals 49 and 48 of primary winding 47 on transformer 50. The circuit of FIGURE 2 could be similarly modified for external drive.

*Operation*

In the circuit of FIGURE 1 transistors 10 and 20 conduct during alternate halves of each cycle and the switching is triggered by the saturation of saturable core 57 on reactor 56. For the purpose of this discussion assume that at this time transistor 10 is conducting and transistor 20 is biased into the non-conductive state. During this half of the cycle the main current can be traced from positive termial 6 through a primary winding 61 from intermediate tap 64 to end terminal 62, through a winding 54 on transformer 50, through transistor 10 from emitter 11 to collector 13, and into negative potential terminal 5. As a result of this current voltages are induced on other windings on transformer 50 and transformer 60. The sense of the windings on transformer 50 is such that during this half of the cycle the top ends of the windings on transformer 50 in FIGURE 1 are positive with respect to the bottom ends. Thus emitter 11 of transistor 10 is biased at a positive potential with respect to base 12 as a result of the voltage induced in winding 53.

During this portion of the cycle the induced voltages in transformer 30 windings are maintained at a relatively low value because the magnetizing effect (ampere turns) of current through winding 33 exceeds that of the current through winding 34 inducing a small amount of positive feedback drive in winding 34 and also because the induced voltage and feedback drive provided by winding 34 and the induced voltage in windings 32, 33, and 35 is limited to a very low value by the diode clamp 36 which is connected across winding 35 on transformer 30. This diode clamp 36 and the turns ratio between windings 35 and 34 and 33 limit the voltages in these windings to a very low value so that they offer little impedance to the flow of current in the clamp direction. Because winding 34 is clamped to a low voltage, essentially all of the voltage across winding 53 is impressed across the emitter-base junction of transistor 10 to render it conductive. Since winding 53 is coupled to the emitter base junction of transistor 10 through the inherently low impedance of winding 34, the induced voltages on windings 53, 54, 52, 51, and 47 are determined by the forward input impedance characteristics of the emitter-base junction of transistor 10.

Diode clamp 36 limits the amount of positive feedback provided by transformer 30 and, therefore, the main positive feedback is provided by winding 53 on transformer 50. Since the core 31 of transformer 30 saturates after a short interval, it will offer very little impedance during the latter portion of the half cycle and consequently winding 53 on transformer 50 will provide all of the drive. At the same time the voltage induced in winding 52 of transformer 50 places base 22 at a positive potential with respect to emitter 21 of transistor 20, maintaining transistor 20 in a non-conductive condition. Core 41 of transformer 40 had been reset during the previous half cycle so that this transformer can provide a high impedance for a short duration during the switching interval. This reset core 41 allows a high voltage to be induced in the windings of transformer 40 such that winding 44 places a positive potential on base 22 of transistor 20 with respect to terminal 27 on winding 52 of transformer 50. The voltage induced in transformer 40 winding 44 adds to the voltage of winding 52 on transformer 50, to raise the potential of the base 22 several volts more positive than the emitter of transistor 20. The higher voltage at base 22 of transistor 20 is caused by voltages induced in winding 44 on transformer 40 and also by the resetting of magnetic flux in choke coil 17. The impedance of winding 44 on transformer 40 momentarily blocks the flow of choke 17 current through winding 44 into winding 52 on transformer 50 during the switching interval. Thus the choke 17 current must flow into base 22 of transistor 20 and render it non-conductive. In effect winding 44 on transformer 40 momentarily decouples base 22 of transistor 20 from terminal 27 on transformer 50 so that base 22 can be biased to a much higher positive potential.

If winding 44 were replaced by a short circuit it would not be possible to raise the back bias base potential of transistor 20 because the induced voltage of transformer winding 52 is inductively coupled to a voltage clamp formed by winding 53 on transformer 50 and the characteristic emitter-base impedance of forward-biased transistor 10. The higher positive potential is applied to the base-emitter junction of transistor 20 by both positive feedback from pulse transformer 40 through winding 44 and by current flow through choke coil 17 as it resets during the initial portion of each cycle. Saturable cores 31 and 41 of transformers 30 and 40 respectively have a low voltage-time integral and they saturate a very short time after the reversal of current. Their effect is felt only during the switching interval when they perform their desired positive feedback and decoupling function to achieve more rapid switching of the current drive power switching circuit.

The voltage induced in transformers 50 and 60 also result in voltage drop across windings 47 and 69 on transformers 50 and 60 respectively. These induced voltages cause current to flow through winding 58 on a saturable core reactor 56. The current remains small until saturable core 57 of reactor 56 saturates. Upon saturation of core 57, the impedance to current flow through winding 58 suddenly decreases. The resulting collapse of field in winding 58 momentarily places a voltage signal of the opposite polarity on transformer 50, making upper ends of windings on transformer 50 momentarily negative with respect to the lower ends. The induced voltage of winding 69 on transformer 60 is applied across winding 47 on transformer 50 and momentarily overrides the inherent positive feedback signal in transformer 50 to recycle the oscillator. The resulting reverse bias on the emitter-base junction of transistor 10 shuts transistor 10 "off," while the resulting forward bias on the emitter-base junction of transistor 20 turns transistor 20 "on."

The main current path may now be traced from positive potential terminal 6, through winding 61, from intermediate tap 64 to end terminal 63, through winding 51 on transformer 50, and through emitter-collector path of transistor 20 onto negative potential terminal 5. Voltages of opposite polarity are now induced in all of the windings and a current in a reverse direction now flows through winding 58 of the saturable core reactor 56. This current remains small and continues until core 57 again saturates, again resulting in the switching of transistor 10 and 20 and in the reversal of the current.

The description of the operation up to this point is similar to the operation of many prior art magnetic oscillators. The significant function in the operation of the present circuit is performed by saturable core pulse transformers 30 and 40. Assume that transistor 10 is just in the process of switching "on" while transistor 20 is just switching "off." The current flow through current feedback winding 54 on transformer 50, energizing all transformer 50 windings and in particular winding 53, provides positive feedback (forward drive) to transistor 10 and winding 52 provides back bias drive to transistor 20. The forward input impedance of transistor 10, however, acts like a zener diode clamp and normally limits the induced voltage in windings 53 and 52 to the emitter-base potential of transistor 10, which normally is approximately ½ of a volt.

The additional transformers 30 and 40, however, momentarily provide additional positive feedback drive and effectively decouple base electrode 22 from feedback winding 52 so that base electrode 22 can be biased to a much higher positive voltage with respect to its emitter 21. With transistor 10 switching "on," the lower end 67 of output winding 65 on transformer 66 will be positive and the output current will flow through winding 33 on transformer 30, winding 43 on transformer 40, rectifier 73, and output terminal 74. The flow of this current through windings 33 and 43 will excite cores 31 and 41 and provide positive feedback drive through windings 34 and 44 to transistors 10 and 20 respectively. The feedback from winding 34 on transformer 30 provides additional momentary forward drive for transistor 10. The voltage induced across winding 33 will be low because the induced voltage per turn for this polarity on transformer 30 is clamped to a very low value by diode 36 connected across winding 35. The current flow through winding 43 on transformer 40, induces voltages in the remaining windings of transformer 40. The induced voltage on winding 44 of transformer 40 places a positive potential on base electrode 22 of transistor 20, adding to the voltage on winding 52 of transformer 50. Transformer 40 has its own saturable core and its induced voltage is not limited by any winding connections. Pulse transformers 30 and 40 have a low voltage time integral and the cores are operated to saturation on each side of the hysteresis loop during alternate half cycles to guarantee resetting of the core flux.

The back bias current path to transistor 20 will offer higher impedance, and therefore transformer 40 will have a relatively high impedance reflected in all windings. The induced voltage in transformer 40 will consequently rise considerably and will be capable of providing sufficient bias to transistor 20 to cause it to switch "off" rapidly.

Series connected diodes 24, 25, and 26 limit back bias voltage applied to the base-emitter junction of transistor 20 to a value safely within the ratings of the transistor and also maintain a minimum back bias pulse duration by limiting the induced back bias voltage in transformer 40 which has a fixed voltage-time integral. Diodes 14, 15, and 16 perform the same function for transistor 10.

After a short time interval core 41 of transformer 40 will saturate, its impedance will drop to nearly zero, and the circuit will function with a normal back-bias voltage as if the pulse transformer were not in the circuit.

During the next half cycle secondary current from end 66 of winding 65 on transformer 60 will flow through winding 42 on transformer 40, winding 32 on transformer 30, rectifier 72, and output terminal 74. This current flow will excite the cores of transformers 40 and 30 to reset the cores, provide initial momentary positive feedback, and provide the higher back bias voltage to the base-emitter junction of transistor 10 and effectively decouple the forward voltage drop of transistor 20, so that it will not limit the back bias voltage of transistor 10.

In FIGURE 1 the drive current for pulse transformers 30 and 40 is obtained from secondary winding 65 of transformer 60. FIGURE 2 shows an alternate embodiment where the feedback current for the pulse transformers is obtained from the current that flows through the primary winding of the output transformer. The operation of FIGURE 2 is similar to the operation of FIGURE 1. Winding 182 on pulse transformer 180 acts to decouple base electrode 112 of transistor 110 from feedback winding 153 on transformer 150 during the switching interval. Winding 192 on pulse transformer 190 acts to decouple base electrode 122 of transistor 120 from feedback winding 152, on transformer 150 during the switching interval. The main drive for transformers 180 and 190 is obtained from winding 181, 186 and 191, 196 respectively in series with the main drive currents. Current flow through windings 181 and 191 induces forward bias in windings 182 and 192 respectively, whereas the current flow through windings 186 and 196 induces back bias drive in windings 182 and 192 respectively. The current flow through windings 181, 186, 191 and 196 is arranged to alternately forward bias one transistor and decouple and back bias the other transistor.

In FIGURE 3 the main drive signal to the power amplifier is provided by an external square wave source. Otherwise the operation of FIGURE 3 is similar to that of FIGURES 1 and 2. The pulse transformers 30 and 40 provide additional positive feedback and momentarily decouple the switching off transistor from the inductively coupled voltage clamp, consisting of the forward biased emitter-base junction of the switching on transistor.

Drive signals from end terminal 37 of winding 53 on transformer 50 are applied through winding 34 on pulse transformer 30 to base electrode 12 of transistor 10. The other end terminal 38 of winding 53 on transformer 50 is connected to emitter 11 of transistor 10. This drive current path alternately provides forward and back bias drive to transistor 10. Also, end terminal 27 on winding 52 of transformer 50 provides drive signals through winding 44 of pulse transformer 40 to base electrode 22 of transistor 20. The other end 28 of winding 52 on transformer 50 is connected to emitter 21 of transistor 20, to complete the drive path. This drive path alternately back-biases and forward-biases transistor 20 to complement transistor 10. The amplifier primary current alternately flows from the source positive terminal 6 to intermediate terminal 64 through winding 61 on transformer 60, through end terminal 62 to emitter electrode 11 on transistor 10, through the emitter-collector junction to collector 13, and then to negative input terminal 5. During the other half of the cycle primary current flows from positive terminal 6, through intermediate tap, 64 through winding 61 on transformer 60 to end terminal 63, to emitter 21 on transistor 20, through the emitter-collector junction to collector 23, and then to the negative terminal 5 back into the source. Transistors 10 and 20 are driven to alternately conduct and alternately pass current through the two halves of winding 61 on transformer 60, exiting the core and all windings on transformer 60.

On one half of the cycle current then flows from end terminal 66 of winding 65, through winding 42 on transformer 40, through winding 32 on transformer 30, to the anode of rectifier 72. The current then flows from the cathode of rectifier 72 to output terminal 74. When the amplifier input is such that transistor 20 conducts, the secondary current flow through winding 42 on transformer 40 aids the forward-bias of transistor 20 while the same current flow through winding 32 on transformer 30 provides a high back-bias voltage pulse to the base of transistor 10 by inductive coupling between windings 32 and 34 on transformer 30. This inductive coupling effectively decouples the voltage clamp formed by the base-emitter junction of transistor 20 so that the base of transistor 10 can be back-biased to a much higher voltage and switched off more rapidly.

A similar action occurs on the other half of the cycle when current from end terminal 67 of secondary winding 65 flows through windings 33 and 43 on transformers 30 and 40 respectively to effectively decouple and back-bias transistor 20.

Many embodiments are possible within the spirit of the present invention. It is therefore intended that the particular circuits shown here are for the purpose of illustration only and that the scope of the invention is limited only by the appended claims.

I claim:

1. In a magnetic oscillator wherein first and second main switching transistors having conductive and nonconductive states are provided and switched to alternately direct current from one polarity terminal of a D.C. voltage source to its opposite polarity terminal through a first and a second current path including an output transformer during alternate halves of the oscillator cycle, the feedback for switching said transistors being at least in part provided by a saturable timing means including a feedback transformer connected to provide bias across the base-emitter junction of each of the two main switching transistors, an improvement comprising:

a first saturable core magnetic switching means connected between the base electrode of said first transistor and said feedback transformer and to said output transformer, said switching means being operable in response to current in said output transformer to decouple the base electrode of said first transistor from said feedback transformer during the time interval when said first transistor is switching from its conductive to its non-conductive state; and a second saturable core magnetic switching means connected between the base electrode of said second transistor and said feedback transformer and to said output transformer, said switching means being operable in response to current in said output transformer to decouple the base electrode of said second transistor from the feedback transformer during the time interval when said second transistor is switching from its conductive to its non-conductive state.

2. In a magnetic oscillator wherein first and second main switching transistors having conductive and nonconductive states are provided and switched to alternately direct current from one polarity terminal of a D.C. voltage source to its opposite polarity terminal through a first and a second current path including an output transformer during alternate halves of the oscillator cycle, the feedback for switching said transistors being at least in part provided by a saturable core feedback transformer having a primary winding coupled to said output transformer and having a secondary winding connected to provide bias across the base-emitter junction of each of the two main switching transistors, an improvement comprising:

a first saturable core magnetic switching means connected between said base electrode of said first transistor and said first end of said secondary winding of said feedback transformer and to said output transformer, said switching means being operable in response to current in said output transformer to decouple the base electrode of said first transistor from said feedback transformer during the time interval when said first transistor is switching from its conductive to its nonconductive state, and to provide positive drive to aid switching of said first transistor from its nonconductive state to its conductive state upon saturation of said core in said feedback transformer; and a second saturable core magnetic switching means connected between said base electrode of said second transistor and said second end of said secondary winding of said input transformer and to said output transformer, said switching means being operable in response to current in said output transformer to decouple the base electrode of said second transistor from said feedback transformer during the time interval when said second transistor is switching from its conductive to its nonconductive state, and to provide positive drive to aid switching of said second transistor when in response to the saturation of said core in said feedback transformer it switches from its nonconductive state to its conductive state.

3. A power amplifier comprising:

a pair of input terminals and a pair of output terminals;

an input transformer having a primary winding connected between said pair of input terminals and having first and second secondary windings;

a first and a second switching transistor each having a base, an emitter and a collector electrode;

an output transformer having a primary winding with an intermediate tap and having a secondary winding connected between said pair of output terminals;

means including said primary winding of said output transformer connecting said emitter electrodes of said first and second switching transistors to one polarity terminal of a D.C. voltage source and connecting the collector electrodes to the opposite polarity terminal of said D.C. voltage source;

a first saturable magnetic switching means connected between said base electrode of said first transistor and said first second winding of said input transformer and to said output transformer, said switching means being operable in response to current in said output transformer to decouple the base electrode of said first transistor from said feedback transformer during the time interval when said first transistor is switching from its conductive to its nonconductive state; and a second saturable core magnetic switching means connected between said base electrode of said second transistor and said second secondary winding of said input transformer and to said output transformer, said switching means being operable in response to current in said output transformer to decouple the base electrode of said second transistor from said feedback transformer during the time interval when said second transistor is switching from its conductive to its nonconductive state.

4. A power amplifier comprising:

a pair of input terminals for receiving an input signal which is alternating between first and second polarities, and a pair of output terminals;

an input transformer having a primary winding connected between said pair of input terminals and having a secondary winding with first and second ends;

a first and a second switching transistor each having a base, an emitter and a collector electrode;

an output transformer having a primary winding with an intermediate tap and having a secondary winding connected between said pair of output terminals;

means including said primary winding of said output transformer connecting said emitter electrodes of said first and second switching transistors to one polarity terminal of a D.C. voltage source and connecting the collector electrodes to the opposite polarity terminal of said D.C. voltage source;

a first saturable core magnetic switching means connected between said base electrode of said first transistor and said first end of said secondary winding of said input transformer and to said output transformer, said switching means being operable in response to current in said output transformer to decouple the base electrode of said first transistor from said feedback transformer during the time interval when said first transistor is switching from its conductive to its non-conductive state, and to provide positive drive to aid switching of said first transistor from its nonconductive state to its conductive state upon reversal of the polarity of the signal at said input terminals and from said first to said second polarity; and a second saturable core magnetic switching means connected between said base electrode of said second transistor and said second end of said secondary winding of said input transformer and to said output transformer, said switching means being operable in response to current in said output transformer to decouple the base electrode of said second transistor from said feedback transformer during the time interval when said second transistor is switching from its conductive to its nonconductive state, and to provide positive drive to aid switching of said second transistor from its nonconductive state to its conductive state upon the reversal of the polarity of said input signal from said second to said first polarity.

5. In a magnetic oscillator wherein first and second main switching transistors are provided and switched to alternately direct current from one polarity terminal of a D.C. voltage supply source to its opposite polarity terminal through a first and a second current path including an output transformer during alternate halves of the oscillator cycle, the feedback for switching said transistors being at least in part provided by a saturable core feedback transformer having a feedback winding connected to provide bias across the base-emitter junction of each of the two main switching transistors, an improvement comprising:

a first pulse transformer having, a saturable core, a first winding connected in a series path with the base electrode of the first main switching transistor, between said base electrode and the feedback winding of the feedback transformer, a second winding connected in series with the first current path, and a third winding connected in series with the second current path; and a second pulse transformer having, a saturable core, a first winding connected in a series path with the base electrode of the second main switching transistor, between the base electrode and the feedback winding of the feedback transformer, a second winding connected in series with the first current path, and a third winding connected in series with the second current path.

6. In a magnetic oscillator wherein first and second main switching transistors are provided and switched to direct current from one polarity terminal of a D.C. voltage supply source to its opposite polarity terminal alternately through a first and a second current path including an output transformer during alternate halves of the oscillator cycle, the feedback for switching said transistors being at least in part provided by a saturable core feedback transformer having feedback windings connected to provide bias across the base-emitter junction of each of the two main switching transistors, an improvement comprising:

a first pulse transformer having, a saturable core, a first winding connected in series path with the base electrode of the first main switching transistor, between the base electrode and the feedback winding of the feedback transformer, and a second winding connected in series with the first current path; and a second pulse transformer having, a saturable core, a first winding connected in a series path with the base electrode of the second main switching transistor, between the base electrode and the feedback winding of the feedback transformer, and a second winding connected in series with the second current path.

7. An oscillator comprising:

a pair of input terminals for connection respectively to positive and negative polarity terminals of a D.C. voltage supply source;

a pair of output terminals;

first and second switching transistors each having a collector, an emitter, and a base electrode;

an output transformer having center tapped primary and secondary windings;

a feedback transformer having a saturable core and a plurality of feedback windings;

a first bias transformer having a saturable core, a first winding, a second winding, and a third winding;

a second bias transformer having a saturable core, a first winding, a second winding, and a third winding;

means interconnecting said primary winding of said output transformer, emitter and collector electrodes of said first and second switching transistors and said pair of input terminals to provide a first current path from one of said input terminals through one half of said primary winding and through the emitter-collector path of said first switching transistor to the other input terminal, and to provide a second current path from one of said input terminals through the other half of the primary winding and through the emitter-collector path of said second switching transistor to the other input terminal;

means connecting the base electrode of said first transistor to one end of the first winding of said first bias transformer and connecting the other end of said first winding to one end of a feedback winding on said feedback transformer, said feedback winding having its other end connected to the emitter electrode of said first switching transistor;

means connecting the base electrode of said second switching transistor to one end of the first winding on said second bias transformer and connecting the other end of said first winding to one end of a feedback winding on said feedback transformer whose other end is connected to the emitter electrode of said second switching transistor;

means connecting one end of the secondary winding of said output transformer to one of said output terminals through a series connection of second windings on said first and second bias transformers, and means connecting the other end of the secondary winding of said output transformer to the other of said pair of output terminals through a series connection of third windings on said first and second bias transformers; and means coupling said feedback transformer to said output transformer.

8. Apparatus as described in claim 1 wherein said saturable timing means includes a third saturable core connected in series with the primary winding of said feedback transformer.

9. Apparatus as described in claim 1 wherein:

said output transformer includes a center-tapped secondary winding; and said first and second saturable core means each include two additional windings, one winding of each saturable core means is connected in series between one end of said secondary winding of said output transformer and the center-tap and the remaining windings are connected between the other end and the center-tap to provide the decoupling action between the feedback transformer and the respective transistor.

References Cited

UNITED STATES PATENTS

| | | | |
|---|---|---|---|
| 3,146,406 | 8/1964 | Wilting | 331—113 |

ROY LAKE, *Primary Examiner.*

J. KOMINSKI, *Assistant Examiner.*